UNITED STATES PATENT OFFICE.

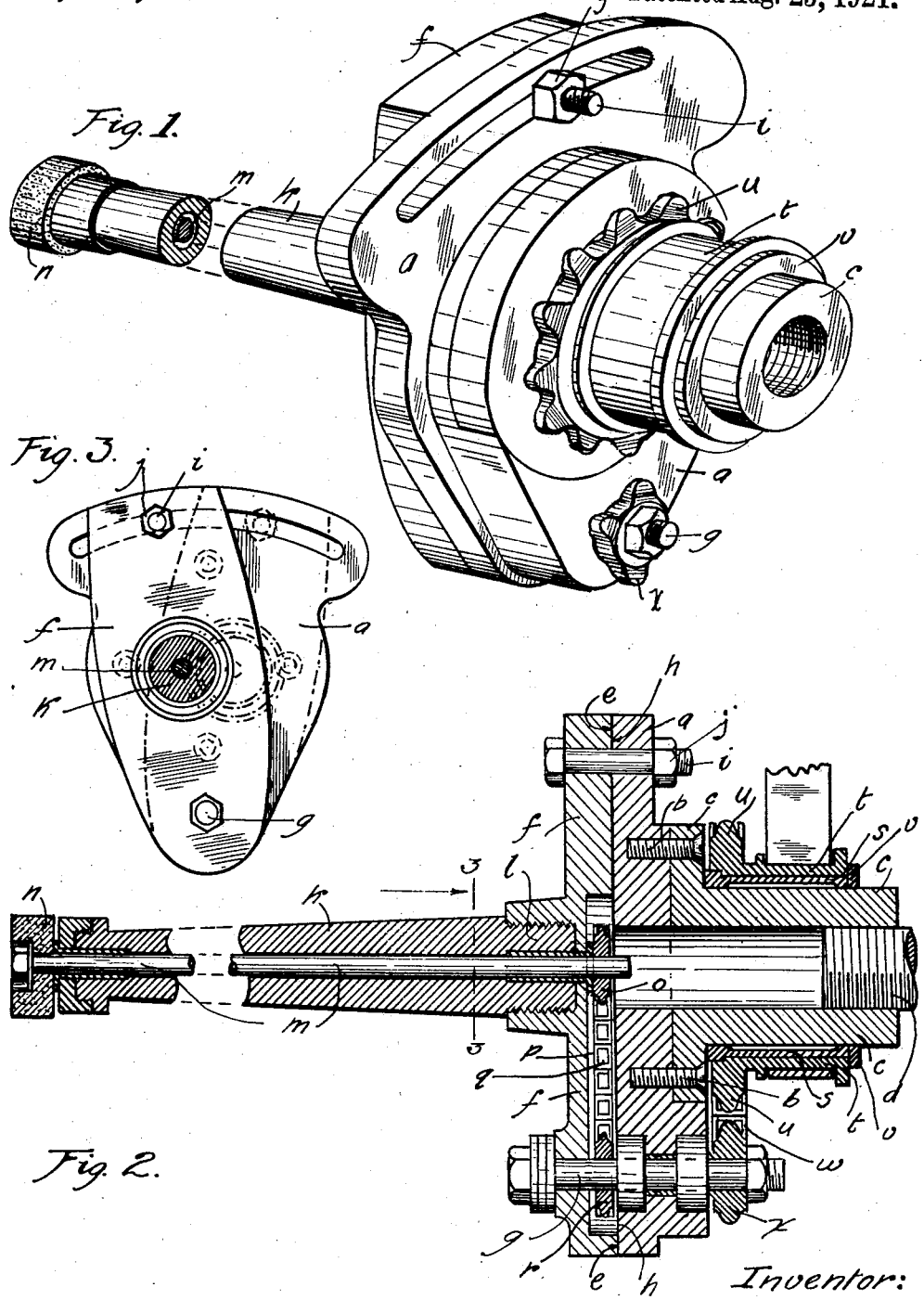

CALVIN I. KEPHART, OF PORTLAND, OREGON.

LATHE ATTACHMENT FOR BORING AND GRINDING CYLINDERS.

1,388,576.  Specification of Letters Patent.  Patented Aug. 23, 1921.

Application filed January 20, 1920. Serial No. 352,876.

*To all whom it may concern:*

Be it known that I, CALVIN I. KEPHART, a citizen of the United States, and a resident of Portland, county of Multnomah, State of Oregon, have invented a new and useful Improvement in Lathe Attachments for Boring and Grinding Cylinders, of which the following is a specification.

My invention relates to that type of lathe attachment for boring and grinding cylinders, and the like, in which the grinding wheel simultaneously with being rotated about its own axis may be given a bodily revolution about the axis of the spindle of the lathe, and thus of the cylinder upon which the work is done, so as to make a true cylindrical bore.

The object of my invention is to provide simple and efficient mechanism, so arranged that the devices transmitting the power for rotating the shaft carrying the grinding wheel will be housed and thus protected from dust, while the power applying devices are carried directly on the attachment; in this way avoiding the necessity of providing a divided shaft for the grinding wheel, one part of which is extended through the head stock of the lathe, in order that the power may be applied to the latter shaft part.

I attain my object by the means illustrated in the accompanying drawings and as hereinafter fully described.

Figure 1 is a perspective sectional view of my improved attachment by itself;

Fig. 2 is a longitudinal vertical section of my attachment, also illustrating the manner of mounting the same on the spindle of the lathe; and Fig. 3 is a sectional view taken on the line 3—3 of Fig. 2 looking in the direction indicated by the arrow.

My improvement is applied to a lathe attachment whose operation embraces two motions, namely the slow speed rotation imparted to the attachment as a whole by the spindle of the lathe on which it is mounted, and having simultaneously rotary motion imparted by the high speed mechanism of the attachment in the manner embodied in my improvement to the abrasive wheel mounted at the outer end of the projector arm.

My invention comprises a face-plate $a$ to which is bolted, by screws $b$, a flanged sleeve $c$ which is firmly mounted on the spindle $d$ of the lathe head-stock, the latter not being shown. Thus the surface $e$ will be rotated in a plane normal to the surface of said lathe spindle $d$.

An offset-plate $f$ is mounted on a shaft $g$ which is journaled in the face-plate $a$ eccentrically to the axis of the lathe spindle. The offset-plate $f$ is provided with a face $h$ parallel with, and bearing on the face $e$ of the face-plate $a$.

The offset-plate $f$ is secured in any desired angular position with respect to the face-plate $a$ by means of a bolt $i$, bearing in a slot $a'$ provided in the face-plate, the bolt $i$ being provided with a clamping nut $j$.

A hollow projector-arm $k$ is rigidly supported, as at $l$, on the offset plate $f$ in axial alinement with the lathe spindle $d$. A shaft $m$ is journaled in the hollow projector-arm $k$, and the outer end of the shaft $m$ carries the abrasive or grinding wheel $n$.

A sprocket pinion $o$ is rigidly mounted on the inner end of the spindle $m$ within a recess $p$ provided in the inner face of the offset plate $f$. Within said recess $p$ is further another sprocket pinion $r$ rigidly mounted on the shaft $g$, and the sprockets $o$ and $r$ are connected by a sprocket-chain $q$, also running in said recess.

On the flanged sleeve $c$ is mounted a bushing $s$, and on the latter is mounted a pulley $t$, having an integral, or otherwise rigidly supported sprocket-gear $u$. The pulley $t$ is held in place by a collar $v$ rigidly mounted on the flanged sleeve $c$, and is connected by a belt 3 with a source of power.

The pulley $t$ is preferably made with flanges serving to hold the belt 3 against shifting laterally.

The shaft $g$ extends beyond the outer face of the face-plate $a$, and on such extending end is rigidly mounted a sprocket pinion $x$, connected by a sprocket-chain $w$ with the sprocket gear $u$ of the pulley $t$.

The shaft $g$ is held against lateral movement by collars as 4.

Thus the power is transmitted, to the spindle $m$ carrying the grinding wheel, by the belt 3 to the pulley $t$, thence by the sprocket gear $u$, sprocket chain $w$ and sprocket pinion $x$ to the shaft $g$, and from the latter by means of the sprocket pinions $r$ and $o$, connected by the sprocket chain $p$; and the spindle $m$ carrying the grinding wheel may be rotated at any desired speed. And the offset plate $f$ may be adjusted as desired with respect to the offset to be given the axis of the spindle *m* from the axis of the spindle of the lathe.

I claim:

1. In a lathe attachment the combination of, a face-plate provided with a lateral projection adapted for mounting the face-plate on the spindle of the lathe, a shaft journaled in said face-plate to one side of the axis of rotation of said spindle, an offset-plate carried by said shaft and having a sliding bearing on said face-plate, the bearing face of the offset plate being provided with a recess, means for adjustably holding the offset-plate in place on the face-plate, a hollow arm projecting from said offset-plate, a spindle journaled in said arm, means operatively connecting the last mentioned spindle with said shaft, such means being housed in said recess, and means carried by said face plate for rotating said shaft independently simultaneously with the rotation of the face-plate by the lathe spindle.

2. In a lathe attachment the combination of, a face-plate provided with a lateral projection adapted for mounting the face-plate on the spindle of the lathe, a shaft journaled in said face-plate to one side of the axis of rotation of said spindle, an offset-plate carried by said shaft and having a sliding bearing on said face-plate, the bearing face of the offset-plate being provided with a recess, means for adjustably holding the offset-plate in place on the face-plate, a hollow arm projecting from said offset-plate, a spindle journaled in said arm, the last mentioned spindle projecting into said recess, sprocket pinions mounted on such projecting spindle-end and on said shaft, respectively, in said recess, a sprocket-chain connecting said sprocket pinions, and means carried by said face-plate for rotating said shaft independently simultaneously with the rotation of the face-plate by the lathe spindle.

3. In a lathe attachment the combination of, a face-plate provided with a lateral projection adapted for mounting the face-plate on the spindle of the lathe, a shaft journaled in said face-plate to one side of the axis of rotation of said spindle, an offset-plate carried by said shaft and having a sliding bearing on said face-plate, the bearing face of the offset-plate being provided with a recess, means for adjustably holding the offset-plate in place on the face-plate, a hollow arm projecting from said offset-plate, a spindle journaled in said arm, means operatively connecting the last mentioned spindle with said shaft, such means being housed in said recess, a pulley ring mounted on said lateral projection of the face-plate, a sprocket rigid with said pulley ring, a second sprocket-pinion rigid on said shaft, the latter projecting exteriorly of said face-plate, and a sprocket-chain connecting the latter sprocket-pinion with said sprocket-gear.

4. In a lathe attachment the combination of, a face-plate provided with a lateral projection adapted for mounting the face-plate on the spindle of the lathe, a shaft journaled in said face-plate to one side of the axis of rotation of said spindle, an offset-plate carried by said shaft and having a sliding bearing on said face-plate, the bearing face of the offset-plate being provided with a recess, means for adjustably holding the offset-plate in place on the face-plate, a hollow arm projecting from said offset-plate, a spindle journaled in said arm, the last mentioned spindle projecting into said recess, sprocket pinions mounted on said projecting spindle-end and on said shaft, respectively, in said recess, a sprocket-chain connecting said sprocket pinions, a pulley ring mounted on said lateral projection of the face-plate, a sprocket rigid with said pulley ring, a second sprocket-pinion rigid on said shaft, the latter projecting exteriorly of said face-plate, and a sprocket-chain connecting the latter sprocket-pinion with said sprocket-gear.

5. A lathe attachment comprising a face-plate, a flanged sleeve removably secured to one side of the face-plate and adapted to directly receive and connect with the spindle of the lathe head stock to operate the face plate, an offset-plate pivotally mounted on the face plate, means for adjusting the offset-plate relative to said face plate on said pivotal mounting, a tool shaft mounted in said offset plate, means for operating said shaft including a member to be driven and supported on said flanged sleeve and driving connections between said member and said shaft.

6. A lathe attachment comprising a face plate, a flanged sleeve removably secured to one side of the face plate and adapted to directly receive and connect with the spindle of the lathe head stock to operate the face plate, a shaft journaled in said face plate to one side of the axis of rotation of said spindle, an off-set plate carried by said shaft and having a sliding bearing on said face plate, the bearing face of the off-set plate being formed with a recess, means for adjustably holding the off-set plate in place on the face plate, a hollow arm projecting from said off-set plate, a spindle journaled in said arm, means housed in said recess and operatively connecting the last mentioned spindle with said shaft, and means carried by said flanged sleeve for rotating said shaft independently and simultaneously with the rotation of the face plate by the lathe spindle.

7. A lathe attachment comprising a face plate, a flanged sleeve removably secured to one side of the face plate and adapted to directly receive and connect with the spindle of the lathe head stock to operate the face plate, a shaft journaled in said face plate to one side of the axis of rotation of said spindle, an off-set plate carried by said shaft and having a sliding bearing on said face plate, the bearing face of the off-set plate being formed with a recess, means for adjustably holding the offset-plate in place on the face plate, a hollow arm projecting from said off-set plate, a spindle journaled in said arm, means housed in said recess and operatively connecting the last mentioned spindle with said shaft, a bushing mounted on the flanged sleeve beyond the face plate, a pulley rotatably mounted on said bushing and having a drive belt channel and a sprocket, a chain connecting said sprocket with a sprocket on said shaft, and means for removably holding the bushing on the flanged sleeve and the pulley on the bushing.

CALVIN I. KEPHART.